(12) United States Patent
Asada et al.

(10) Patent No.: US 8,691,087 B1
(45) Date of Patent: Apr. 8, 2014

(54) FILTRATION APPARATUS

(71) Applicant: Mosnic Corporation, Saitama (JP)

(72) Inventors: Kazumi Asada, Saitama (JP); Shuichi Mogi, Saitama (JP)

(73) Assignee: Mosnic Corporation, Saitama (JP)

( * ) Notice: Subject to any disclaimer, the term of this patent is extended or adjusted under 35 U.S.C. 154(b) by 0 days.

(21) Appl. No.: 14/051,963

(22) Filed: Oct. 11, 2013

(30) Foreign Application Priority Data

Feb. 28, 2013 (JP) ................................. 2013-038102

(51) Int. Cl.
| | | |
|---|---|---|
| *B01D 21/18* | (2006.01) | |
| *B01D 33/06* | (2006.01) | |
| *B01D 33/073* | (2006.01) | |
| *B01D 33/70* | (2006.01) | |
| *B01D 35/06* | (2006.01) | |
| *B03C 1/30* | (2006.01) | |
| *B23Q 11/00* | (2006.01) | |

(52) U.S. Cl.
CPC ............... *B01D 21/18* (2013.01); *B01D 33/06* (2013.01); *B01D 33/073* (2013.01); *B01D 33/70* (2013.01); *B01D 35/06* (2013.01); *B03C 1/30* (2013.01); *B23Q 11/00* (2013.01)
USPC .............. 210/167.03; 210/167.04; 210/172.2; 210/223; 210/298; 210/396; 210/523

(58) Field of Classification Search
CPC ...... B01D 21/18; B01D 33/06; B01D 33/073; B01D 33/70; B01D 35/06; B03C 1/30; B23Q 11/00
USPC ........... 210/167.03, 167.04, 172.2, 223, 298, 210/396, 523
See application file for complete search history.

(56) References Cited

U.S. PATENT DOCUMENTS 7,638,061 B2 * 12/2009 Moore ..................... 210/167.03
7,906,021 B2 * 3/2011 Tashiro ..................... 210/167.03

FOREIGN PATENT DOCUMENTS

| JP | 01-139113 A | 5/1989 |
| JP | 2000-300914 A | 10/2000 |
| JP | 2010-064164 A | 3/2010 |
| JP | 2012-143833 A | 8/2012 |

* cited by examiner

*Primary Examiner* — David A Reifsnyder
(74) *Attorney, Agent, or Firm* — Norris McLaughlin & Marcus P.A.

(57) ABSTRACT

A filtration apparatus that removes chips from a chip-containing machining fluid is applied which effectively prevents clogging of a filtration filter that makes up the apparatus. A filtration apparatus 1 is provided with a magnet 9 attached to an outer wall surface of a drum housing chamber 5, the magnet 9 functions as means for fixing chips in the machining fluid that flows into the drum housing chamber 5 from an inlet 16 on a bottom surface 5B or a slope 5A of the drum housing chamber 5 by a magnetic force, and the periphery of the inlet 16 is configured as a magnet non-existent section 17 where the magnet 9 does not exist so as to suppress a phenomenon that chips in the machining fluid are fixed near a top edge of the slope 5A of the drum housing chamber 5 by the magnetic force of the magnet 9.

4 Claims, 6 Drawing Sheets

FILTRATION APPARATUS

BACKGROUND OF THE INVENTION

1. Field of the Invention

The present invention relates to a filtration apparatus that removes chips from a chip-containing machining fluid such as a grinding fluid or cutting fluid used at a machining center, for example, and is particularly intended to effectively prevent clogging of a filtration filter that makes up the apparatus.

2. Description of the Related Art

Filtration apparatuses are conventionally used as means for removing chips from a chip-containing machining fluid such as a grinding fluid or a cutting fluid used at a machining center. Filtration apparatuses disclosed, for example, in Japanese Patent Application Laid-Open No. 2012-143833 and Japanese Patent Application Laid-Open No. 1-139113 are known as such types of filtration apparatuses.

The filtration apparatus of Japanese Patent Application Laid-Open No. 2012-143833 adopts a configuration of housing a chip conveying member (2) in a chip conveying member housing (1) and providing an input port (3) and an ejecting port (4), a configuration of conveying chips in a machining fluid (used cutting fluid) inputted through the input port (3) up to the ejecting port (4) using the chip conveying member (2), a configuration of causing the machining fluid to flow into a rotary filtration drum housing (5) from the chip conveying member housing (1) through an inflow side (10) and filtration filtering the machining fluid using a filtration drum (6) that rotates in the rotary filtration drum housing (5), a configuration of scraping the chips deposited on a bottom surface of the rotary filtration drum housing (5) using a scraper conveyor (12), and a configuration of sending the scraped chips from a baffle plate (11) in a direction of the chip conveying member (2).

In the filtration apparatus according to Japanese Patent Application Laid-Open No. 2012-143833 that adopts the above configuration, of the chips in the machining fluid introduced from the input port (3), relatively heavy chips are deposited on the bottom surface of the chip conveying member housing (1), conveyed up to the ejecting port (4) via the chip conveying member (2) and finally ejected to the outside from the ejecting port (4).

However, according to the filtration apparatus in Japanese Patent Application Laid-Open No. 2012-143833, when chips floating in the introduced machining fluid (hereinafter referred to as "floating chips") exist as described above, such floating chips unavoidably enter the rotary filtration drum housing (5), and the introduced floating chips may be stuck to a filtration filter on an outer circumferential surface of the filtration drum (6), causing clogging of the filtration filter with the chips.

On the other hand, the filtration apparatus according to Japanese Patent Application Laid-Open No. 1-139113 adopts a configuration of arranging a magnet (20) on a bottom surface (1B) of a cutting fluid input tank (1) and fixing floating chips to the bottom surface (1B) of the cutting fluid input tank (1) through a magnetic force of the magnet (20) and a configuration of scraping the fixed floating chips from the bottom surface (1B) of the cutting fluid input tank (1) using a scraper plate (7A).

To solve the problem with the filtration apparatus of aforementioned Japanese Patent Application Laid-Open No. 2012-143833 (clogging of the filtration filter with chips), the technique of fixing floating chips by a magnetic force of the magnet (20) disclosed in Japanese Patent Application Laid-Open No. 1-139113 may be applied to the filtration apparatus in Japanese Patent Application Laid-Open No. 2012-143833.

However, Japanese Patent Application Laid-Open No. 1-139113 has no description taking into consideration the influence of the magnet (20) in the periphery of the inflow side (10) as to how the magnetic force of the magnet (20) acts in the periphery of the inflow side (10) of the filtration apparatus of Japanese Patent Application Laid-Open No. 2012-143833.

For this reason, with the filtration apparatus described in Japanese Patent Application Laid-Open No. 2012-143833 employing the floating chip fixing technique using the magnetic force of the magnet (20) disclosed in Japanese Patent Application Laid-Open No. 1-139113, a floating chip returning phenomenon and a floating chip re-fixing phenomenon which will be described below occur in the periphery of the inflow side (10) repeatedly, causing the floating chips to circulate.

<<Floating Chip Returning Phenomenon>>

The floating chip returning phenomenon refers to a phenomenon that in the filtration apparatus described in Japanese Patent Application Laid-Open No. 2012-143833, floating chips are fixed in the vicinity of the top edge of an inclined extension plate (8) located in the periphery of the inflow side (10) by a magnetic force of the magnet, the floating chips fixed in this way are scraped by the scraper conveyor (12) and returned to the chip conveying member housing (1).

<<Floating Chip Re-Fixing Phenomenon>>

The floating chip re-fixing phenomenon refers to a phenomenon that in the filtration apparatus of Japanese Patent Application Laid-Open No. 2012-143833, the floating chips returned as described above flow into the rotary filtration drum housing (5) riding on the flow of the machining fluid directed to the rotary filtration drum housing (5) from the chip conveying member housing (1) via the inflow side (10), and are re-fixed in the vicinity of the top edge of the extension plate (8) by the magnetic force of the magnet.

With the filtration apparatus described in Japanese Patent Application Laid-Open No. 2012-143833, even when the floating chip fixing technique by the magnetic force of the magnet (20) disclosed in Japanese Patent Application Laid-Open No. 1-139113 is applied, circulation of the floating chips occurs in the periphery of the inflow side (10) as described above, and therefore the circulating floating chips may deviate from the circulation path and arrive at the filtration filter on the outer circumferential surface of the filtration drum (5), increasing the likelihood of clogging of the filtration filter with the chips.

Note that the parenthesized reference numerals are reference numerals used in respective Japanese Patent Application Laid-Open No. 2012-143833 and Japanese Patent Application Laid-Open No. 1-139113.

The present invention has been implemented to solve the above problems, and it is an object of the present invention to apply a filtration apparatus that removes chips from a chip-containing machining fluid and effectively prevent clogging of a filtration filter that makes up the filtration apparatus.

SUMMARY OF THE INVENTION

In order to attain the above object, the present invention is a filtration apparatus that removes chips from a chip-containing machining fluid, including a conveying path for the chips, a chip conveying member provided in the conveying path, a filtration drum provided parallel to the conveying path, a drum housing chamber that houses the filtration drum, a communication section that communicates with the drum housing chamber from the conveying path, a baffle plate disposed in the communication section, a chip scraping member provided in the drum housing chamber, and a magnet attached to an outer wall surface of the drum housing chamber, wherein the conveying path is provided with an input port for a machining fluid provided on an upstream side thereof and an ejecting port for chips provided on a downstream side thereof, the chip conveying member conveys chips in the machining fluid from the input port to the ejecting port, the filtration drum is driven to rotate around a shaft center parallel to the chip conveying direction in the conveying path, an outer circumferential surface of the filtration drum constituting a filtration filter for the machining fluid, the drum housing chamber is provided with a slope inclined from a side wall of the conveying path toward the filtration drum near the communication section and a bottom surface continuous to the slope, and includes a gap that allows the chip scraping member to move between the bottom surface or the slope and the outer circumferential surface of the filtration drum, the baffle plate has a width smaller than that of the communication section, has such a shape that extends from the slope of the drum housing chamber through the communication section so as to protrude over the conveying path, is disposed closer to one side far from the input port out of both sides of the communication section to thereby function as means for blocking the machining fluid from flowing from the conveying path into the drum housing chamber via the communication section within a setup range, while allowing the machining fluid to flow into the drum housing chamber outside the setup range, the chip scraping member functions as means for moving through the gap of the drum housing chamber toward the communication section to thereby scrape chips from the bottom surface or the slope of the drum housing chamber and sending the scraped chips from the baffle plate to the conveying path, the magnet functions as means for fixing the chips in the machining fluid flowing into drum housing chamber from the inlet by a magnetic force on the bottom surface or the slope of the drum housing chamber, and the periphery of the inlet is configured as a magnet non-existing section where the magnet does not exist so as to suppress a phenomenon that chips in the machining fluid are fixed in the vicinity of the top edge of the slope of the drum housing chamber by the magnetic force of the magnet.

In the present invention, the chip conveying member may be formed of a non-magnetic material or a magnetic material.

In the present invention, the filtration drum including the filtration filter may be formed of a non-magnetic material or a magnetic material.

In the present invention, a configuration may be adopted in which the vicinity of the top edge of the slope located in the periphery of the inlet is used as the magnet non-existent section and the magnet is provided within a range that covers the remaining slope portion other than the top edge of the slope and the bottom surface of the drum housing chamber.

With the adoption of the configuration in the present invention, the floating chips in the machining fluid inputted from the input port move from the inlet to the back of the drum housing chamber after passing through the vicinity of the top edge of the slope of the drum housing chamber, but since the periphery of the inlet is configured as the magnet non-existent section where the magnet does not exist, a phenomenon that the chips in the machining fluid are fixed in the vicinity of the top edge of the slope of the drum housing chamber by a magnetic force is suppressed. For this reason, in the periphery of the inlet, the chips are not fixed in the vicinity of the top edge of the slope of the drum housing chamber by the magnetic force, and the chips smoothly pass through the vicinity of the top edge of the slope and move to the back of the drum housing chamber, and it is thereby possible to avoid the problem caused by the floating chips being fixed in the vicinity of the top edge of the slope of the drum housing chamber by the magnetic force, that is, prevent circulation of chips in the periphery of the inlet.

As described above, the present invention can prevent circulation of chips in the periphery of the inlet, and can thereby eliminate the possibility that circulating chips may deviate from the circulation path, arrive at the filtration filter and cause clogging of the filtration filter with the chips, and thus can apply a filtration apparatus that effectively prevents clogging of the filtration filter.

DETAILED DESCRIPTION OF THE PREFERRED EMBODIMENTS

Hereinafter, preferred embodiments for implementing the present invention will be described in detail with reference to the accompanying drawings.

<<Overview of Filtration Apparatus>>

Figure 1:
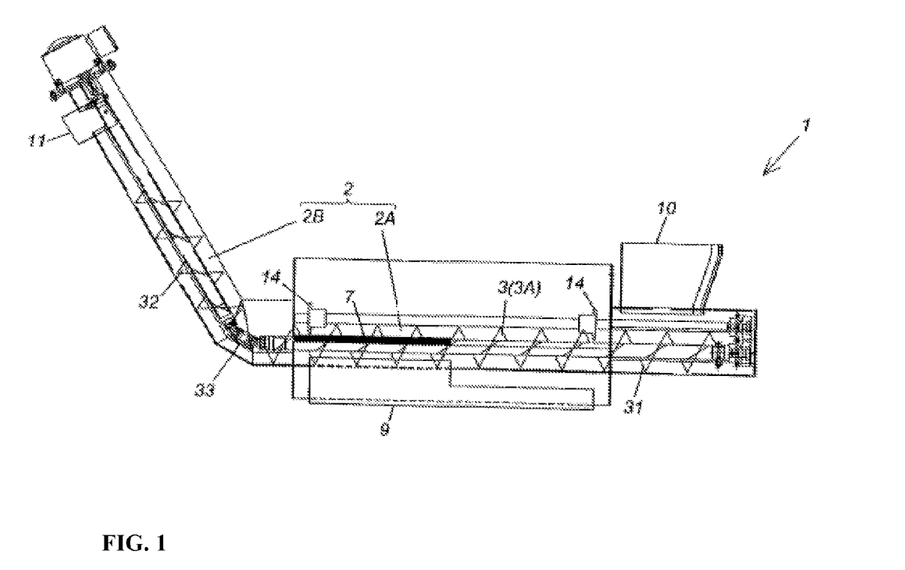
FIG. 1 is a cross-sectional view of a filtration apparatus to which the present invention is applied, viewed from the front.
Figure 2:
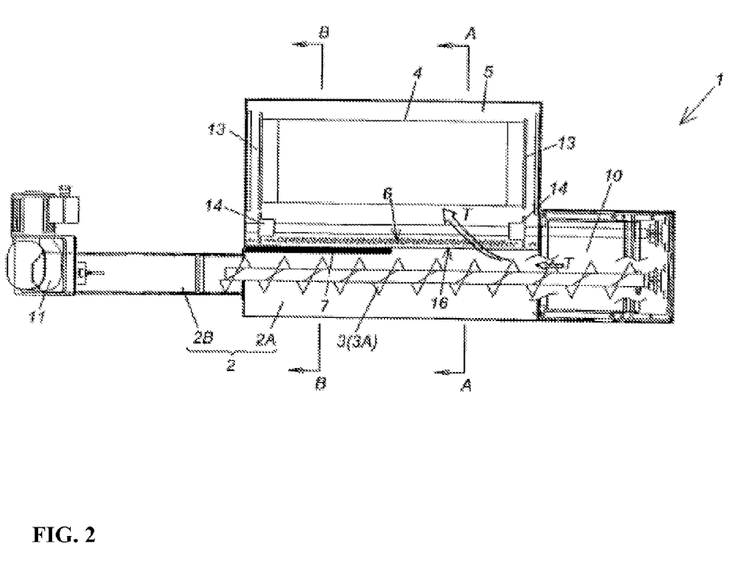
FIG. 2 is a cross-sectional view of the filtration apparatus in FIG. 1 viewed from the top surface.
Figure 3:
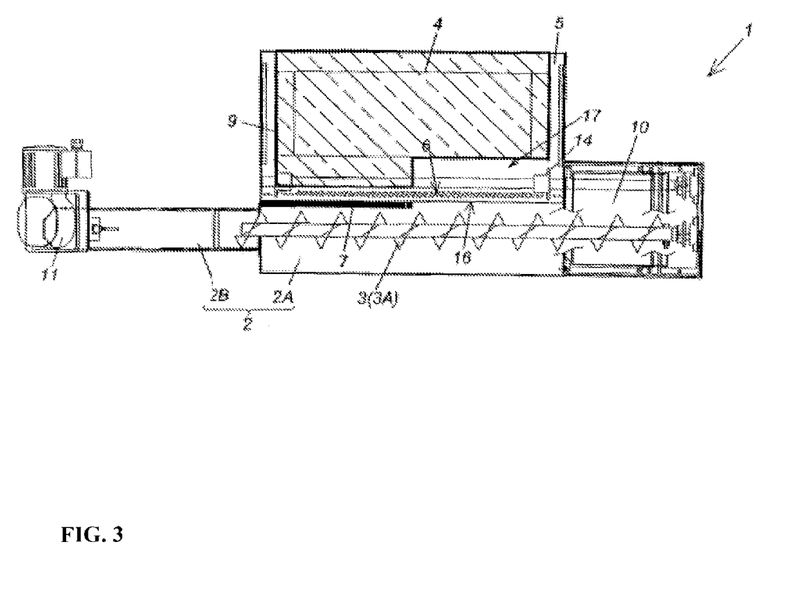
FIG. 3 is a magnet arrangement configuration diagram when the magnet is seen from above the filtration apparatus in FIG. 1 through the filtration drum and the drum housing chamber of the apparatus.
Figure 4:
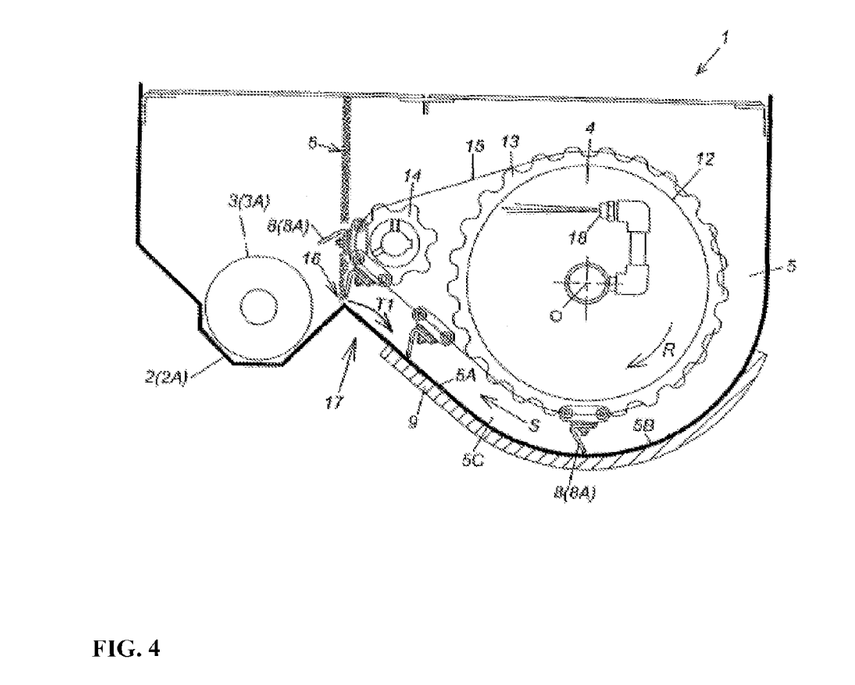
FIG. 4 is a cross-sectional view along a line A-A in FIG. 2.
Figure 5:
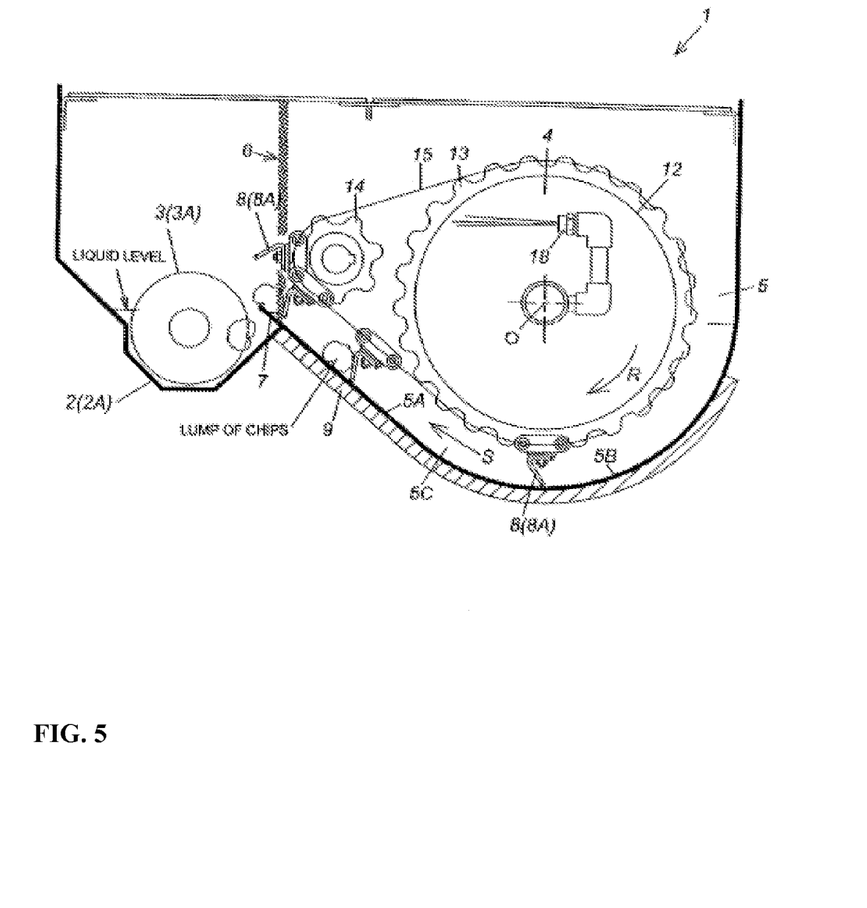
FIG. 5 is a cross-sectional view along a line B-B in FIG. 2.

FIG. 1 is a cross-sectional view of a filtration apparatus to which the present invention is applied, viewed from the front, FIG. 2 is a cross-sectional view of the filtration apparatus in FIG. 1 viewed from the top surface, FIG. 3 is a magnet arrangement configuration diagram when the magnet is seen from above the filtration apparatus in FIG. 1 through the filtration drum and the drum housing chamber of the apparatus, FIG. 4 is a cross-sectional view along a line A-A in FIG. 2 and FIG. 5 is a cross-sectional view along a line B-B in FIG. 2. Note that since it is difficult to illustrate a communication section 6 in FIG. 2 to FIG. 6, the position of the communication section 6 is shown by grid-like shaded area.

A filtration apparatus 1 in FIG. 1 is a filtration apparatus that removes chips from a chip-containing machining fluid, including a chip conveying path 2, a chip conveying member 3 provided in the conveying path 2, a filtration drum 4 provided parallel to the conveying path 2 as shown in FIG. 2, a drum housing chamber 5 that houses the filtration drum 4, a communication section 6 that communicates with the drum housing chamber 5 from the conveying path 2, a baffle plate 7 disposed in the communication section 6, a chip scraping member 8 provided for the drum housing chamber 5 as shown in FIG. 4 and FIG. 5 and a magnet 9 (see FIG. 3 to FIG. 5) attached to an outer wall surface of the drum housing chamber 5.

<<Detailed Configuration of Conveying Path>>

The conveying path 2 has a groove shape enabled to accommodate the chip conveying member 3 as shown in FIG.

4 and FIG. 5, and is provided with an input port 10 for a machining fluid provided on an upstream side thereof and an ejecting port 11 for chips provided on a downstream side thereof. A used machining fluid is inputted to the input port 10 and chips in the machining fluid are ejected from the ejecting port 11.

Furthermore, the conveying path 2 is formed as a non-tilting section 2A without tilting in a range from the vicinity of the input port 10 including the communication section 6 (see FIG. 2 to FIG. 5) as shown in FIG. 1 and an uprising tilting section 2B in a range from the non-tilting section 2A to the ejecting port 11 downstream of the non-tilting section 2A as shown in FIG. 1.

<<Detailed Configuration of Chip Conveying Member>>

The chip conveying member 3 is formed of a non-magnetic material or a magnetic material, and conveys chips in the machining fluid from the input port 10 to the ejecting port 11 in the non-tilting section 2A and the tilting section 2B of the conveying path 2 described above. As a specific example of the chip conveying member 3, the filtration apparatus 1 in FIG. 1 adopts a screw conveyor 3A, but without being limited to this, a publicly known hinge conveyor or a scraper conveyor or the like may also be adopted as the chip conveying member 3.

The screw conveyor 3A (chip conveying member) adopted for the filtration apparatus 1 in FIG. 1 is driven to rotate by a motor or the like as a drive source to convey chips with rotating screws. To be more specific, the screw conveyor 3A has a structure provided with a non-tilting screw conveyor section 31 set up so as to adapt to the non-tilting section 2A of the aforementioned conveying path 2 and a tilting screw conveyor section 32 set up so as to adapt to the tilting section 2B of the conveying path 2, and a joint 33 couples the non-tilting screw conveyor section 31 and the tilting screw conveyor section 32.

The torque of the non-tilting screw conveyor section 31 is transmitted to the tilting screw conveyor section 32 via the joint 33, the non-tilting screw conveyor section 31 and the tilting screw conveyor section 32 thereby rotate in conjunction and synchronization with each other, and the non-tilting screw conveyor section 31 conveys chips in such a way as to push the chips by rotating screws in a direction substantially parallel to a setup surface (not shown) of the filtration apparatus 1. On the other hand, the tilting screw conveyor section 32 conveys chips in such a way as to push up the chips by rotating screws in a diagonally upward direction with respect to the setup surface (not shown) of the filtration apparatus 1.

<<Detailed Configuration of Filtration Drum>>

According to FIG. 4 and FIG. 5, the filtration drum 4 has a circular cross section, is driven to rotate around a shaft center O parallel to the chip conveying direction in the conveying path 2 (more specifically, central axial line of the cylinder) and an outer circumferential surface of the filtration drum constitutes a filtration filter 12 for the machining fluid. The filtration filter 12 functions as means for catching chips other than floating chips which have flown into the drum housing chamber 5 from the conveying path 2 via the communication section 6, for example, relatively heavy and large-sized chips which have dropped off the conveying path 2.

Though not illustrated, this type of filtration drum 4 may have a configuration, for example, provided with a pair of mutually opposing ring members and a plurality of columnar members that connect the ring members, with a filtration filter such as nylon net wound around the circumference (girth) of a cylindrical frame body formed of the ring members and the columnar member.

As a specific configuration example of driving the aforementioned filtration drum 4 around the shaft center O, the filtration apparatus 1 in FIG. 1 adopts a configuration in which a support shaft (not shown) is provided so as to protrude from the center on one end face of the filtration drum 4, the support shaft is supported by a bearing (not shown) such as a ball bearing so as to set up the filtration drum 4 in a rotatable manner and a configuration in which the torque of a motor (not shown) or the like is transmitted to the filtration drum 4 via power transmission means, but the present invention is not limited to such configuration examples.

According to FIG. 4 and FIG. 5, as a specific configuration example of the power transmission means, the filtration apparatus in FIG. 1 adopts a configuration in which a first sprocket 13 is attached to an outer circumferential surface of one end of the filtration drum 4, a second sprocket 14 is attached to an outer circumferential surface of the output shaft of a motor (not shown) or the like, and these two sprockets 13 and 14 are connected by a chain 15, but the power transmission means is not limited to this configuration example.

A machining fluid filtered by the filtration filter 12 is temporarily stored inside the filtration drum 4. As the structure of exhausting the stored filtered machining fluid to the outside, various exhausting structures can be adopted such as a structure of exhausting the machining fluid from an outlet (not shown) formed on an end face of the filtration drum 4 to the outside or a structure in which a hollow shaft is used for the aforementioned support shaft (not shown) of the filtration filter 4, a hose is inserted into the hollow shaft to suction the filtered machining fluid from within the filtration filter 4 and exhaust it to the outside.

The whole filtration drum 4 including the filtration filter 12 may be formed of a magnetic material to reduce the cost, but may be preferably formed of a non-magnetic material such as stainless steel. This is because when the whole filtration drum 4 is formed of a magnetic material, the filtration drum 4 itself is magnetized by the magnet 9, and a magnetic force generated through the magnetization thereof may increase the likelihood that chips will stick to the filtration filter 12, producing clogging of the filtration filter 12 with chips.

<<Detailed Configuration of Drum Housing Chamber>>

As shown in FIG. 4 and FIG. 5, the drum housing chamber 5 is provided with a slope 5A which is inclined from a side wall of the conveying path 2 near the communication section 6 toward the filtration drum 4 and a bottom surface 5B which is continuous to the slope 5A, and includes a gap 5C between the bottom surface 5B or the slope 5A and the outer circumferential surface of the filtration drum 12 that allows the chip scraping member 8 to move therethrough.

In the filtration apparatus 1 in FIG. 1, the bottom surface 5B of the drum housing chamber 5 is formed in an arcuate shape according to the outer circumferential surface of the filtration drum 4, and therefore the gap 5C between the bottom surface 5B of the drum housing chamber 5 and the outer circumferential surface of the filtration drum 12 is also curved along the outer circumferential surface of the filtration drum 12 within a range of the bottom surface B5.

<<Detailed Configuration of Communication Section>>

The communication section 6 (grid-like shaded area in FIG. 2 to FIG. 5) communicates with the drum housing chamber 5 from the conveying path 2 in the non-tilting section 2A of the conveying path 2 described above. The communication section 6 can be configured in the non-tilting section 2A of the conveying path 2 without providing any partition between the conveying path 2 and the drum housing chamber 5.

<<Detailed Configuration of Baffle Plate>>

According to FIG. 2, the baffle plate 7 has a width smaller than that of the communication section 6 and has a shape sticking out of the communication section 6 from the slope 5A of the drum housing chamber 5 as shown in FIG. 5 and protruding over the conveying path 2. The filtration apparatus 1 in FIG. 1 adopts a specific protruding shape of the baffle plate 7 in which part of the slope 5A of the drum housing chamber 5 described above is extended to the conveying path 2, but the baffle plate 7 is not limited to this extended shape example.

Furthermore, as shown in FIG. 2, the baffle plate 7 is placed on one side farther from the input port 10 out of both sides of the communication section 6 so as to function as means for blocking the inflow of the machining fluid into the drum housing chamber 5 via the communication section 6 from the conveying path 2 within the setup range thereof, while allowing the inflow as an inlet 16 outside the setup range.

<<Detailed Configuration of Chip Scraping Member>>

According to FIG. 5, the chip scraping member 8 moves through the gap 5C of the drum housing chamber 5 toward the communication section 6 (in a direction indicated by an arrow S in FIG. 5) to thereby function as means for scraping chips from the bottom surface 5B and the slope 5A of the drum housing chamber 5 and sending the scraped chips from the baffle plate 7 to the conveying path 2.

As a specific example of the structure of the chip scraping member 8, the filtration apparatus 1 in FIG. 1 adopts a structure in which a plurality of spatula-shaped scraper plates 8A are attached to the chain 15 (see FIG. 4 and FIG. 5) of the power transmission means described above at regular intervals and the plurality of scraper plates 8A repeatedly pass through the gap 5C as the chain 15 moves rotating, but the chip scraping member 8 is not limited to this structure example. For example, the scraper plate 8A may also be configured so as to repeatedly pass through the gap 5C by another mechanism other than the chain 15.

The chip scraping member 8 is formed of a non-magnetic material such as stainless steel. This is because when the chip scraping member 8 is formed of a magnetic material, the chip scraping member 8 itself is magnetized by the magnet 9, and a magnetic force generated through the magnetization thereof may increase the likelihood that chips will stick to the chip scraping member 8, and cause the chips dropping off the chip scraping member 8 to stick to the filtration filter 12 thereby producing clogging of the filtration filter 12 with chips.

<<Detailed Configuration of Magnet>>

The magnet 9 targets chips in the machining fluid which has flown into the drum housing chamber 5 from the inlet 16 and functions as means for fixing the target chips on the bottom surface 5B and the slope 5A of the drum housing chamber 5 by a magnetic force. This function effectively prevents clogging of the filtration filter 12 generated by floating chips (chips floating in the machining fluid) sticking to the filtration filter 12.

According to FIG. 2, a flow of the machining fluid from the conveying path 2 to the drum housing chamber 5 is generated as indicated by an arrow T in FIG. 2 in the periphery of the inlet 16. Riding on the flow of the machining fluid, the floating chips in the machining fluid also enter the drum housing chamber 5 through the inlet 16 from the conveying path 2.

When the floating chips flowing into the drum housing chamber 5 are fixed in the periphery of the inlet 16 and in the vicinity of the top edge of the slope 9 of the drum housing chamber 5 in particular, circulation of the floating chips occurs through repetition of a floating chip returning phenomenon in (A) below and a floating chip re-fixing phenomenon in (B) below.

(A) Floating Chip Returning Phenomenon

This floating chip returning phenomenon is a phenomenon that floating chips fixed in the vicinity of the top edge of the slope 5A of the drum housing chamber 5 by a magnetic force are scraped by the chip scraping member 8 and returned to the conveying path 2.

(B) Floating Chip Re-Fixing Phenomenon

This floating chip re-fixing phenomenon is a phenomenon that the floating chips returned as described above flow into the drum housing chamber 5 again from the inlet 16 riding on the aforementioned flow of the machining fluid, and are re-fixed in the vicinity of the top edge of the slope 5A of the drum housing chamber 5 by a magnetic force.

For this reason, when a configuration is adopted in which the magnetic force of the magnet 9 extends to the vicinity of the top edge of the slope 5A of the drum housing chamber 5, the floating chips circulating in the periphery of the inlet 16 come off the circulation path and arrive at the filtration filter 12, which may cause clogging of the filtration filter 12 with chips.

Thus, the filtration apparatus 1 in FIG. 1 configures the periphery of the inlet 16 as means for preventing problems caused by the aforementioned circulation of floating chips (clogging of the filtration filter 12) as a magnet non-existent section 17 where the magnet 9 does not exist as shown in FIG. 3 and FIG. 4, and thereby prevents the phenomenon that chips in the machining fluid are fixed in the vicinity of the top edge of the slope 5A of the drum housing chamber 5 by a magnetic force.

Particularly, the filtration apparatus 1 in FIG. 1 adopts a configuration in which the vicinity of the top edge of the slope 5A located in the periphery of the inlet 16 is configured as the magnet non-existent section 17 as described above and the magnet 9 is provided in the range covering the remaining portion of the slope 5A other than the vicinity of the top edge of the slope and the bottom surface 5B of the drum housing chamber 5.

Figure 6:
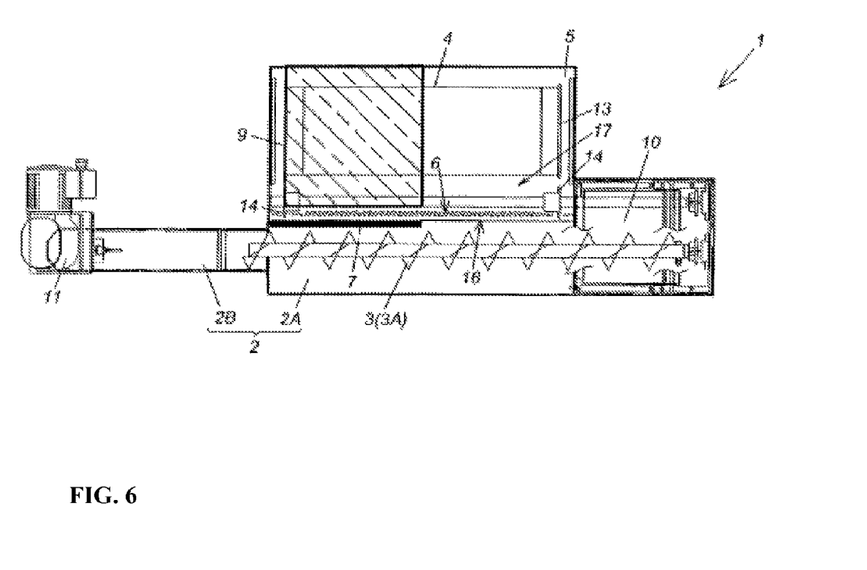
FIG. 6 is another magnet arrangement configuration diagram when the magnet is seen from above the filtration apparatus in FIG. 1 through the filtration drum and the drum housing chamber of the apparatus.

As another embodiment of the magnet non-existent section 17 as described above, a configuration, for example, as shown in FIG. 6 may also be adopted in which the magnet non-existent section 17 is extended and expanded up to the bottom surface 5B of the drum housing chamber 5.

From the relation with the chip conveying direction by the chip conveying member 3, since the flow of the machining fluid from the inlet 16 to the drum housing chamber 5 becomes a flow toward one side of the drum housing chamber 5 where the baffle plate 7 is located, floating chips are often located only on one side of the drum housing chamber 5: the bottom surface 5B or the slope 5A. In this case, it is considered sufficient to adopt the other embodiment of the magnet non-existent section 17 described above and fix floating chips on the bottom surface 5B or the slope 5A on one side of the drum housing chamber 5 by a magnetic force. Adopting the other embodiment in this way can achieve a cost reduction of the apparatus by omitting the magnet 9.

<<Other Configuration>>

An injection nozzle section 18 is provided inside the filtration drum 4, and air or a liquid is jetted from the injection nozzle section 18 onto the filtration filter 12 on the outer circumferential surface of the filtration drum 4 to thereby wash out chips stuck to the filtration filter 12.

<<Description of Operation of Filtration Apparatus in FIG. 1>>

By pressing, for example, a start switch (not shown), the filtration apparatus 1 in FIG. 1 performs operation of the chip conveying member 3 conveying chips from the input port 10 to the ejecting port 11, operation of the filtration drum 4 rotating in a direction indicated by an arrow R in FIG. 4 and FIG. 5, and operation of the chip scraping member 8 scraping chips from the bottom surface 5B or the slope 5A of the drum housing chamber 5 by moving through the gap 5C in the direction indicated by the arrow S in FIG. 4 and FIG. 5 in conjunction with rotation of the filtration drum 4.

To filter the machining fluid using the filtration apparatus 1 in FIG. 1, the machining fluid is injected into the input port 10. The injected machining fluid flows into the conveying path 2, and when the liquid level (see FIG. 5) of the injected machining fluid exceeds the side wall of the conveying path 2, the machining fluid overflowing from the conveying path 2 in the vicinity of the communication section 6 flows into the drum housing chamber 5 after passing through the inlet 16.

Of the chips in the machining fluid injected as described above, relatively heavy chips are deposited on the bottom surface of the conveying path 2 under their own weights, conveyed to the ejecting port 11 by the chip conveying member 3 and finally ejected to the outside from the ejecting port 11.

On the other hand, the floating chips in the machining fluid injected as described above flows into the drum housing chamber 5 after passing through the inlet 16 from the conveying path 2, riding on the flow of the machining fluid from the conveying path 2 to the drum housing chamber 5 via the inlet 16 (flow in the direction indicated by the arrow T in FIG. 4).

In that case, the floating chips in the machining fluid moves to the back of the drum housing chamber 5 after passing through the vicinity of the top edge of the slope 5A of the drum housing chamber 5 from the inlet 16 as indicated by an arrow T1 in FIG. 4. However, the configuration in which the periphery of the inlet 16 is configured as the magnet non-existent section 17 where the magnet 9 does not exist as described above suppresses the phenomenon that chips in the machining fluid are fixed in the vicinity of the top edge of the slope 5A of the drum housing chamber 5 by a magnetic force.

This prevents chips from fixing in the vicinity of the top edge of the slope 5A of the drum housing chamber in the periphery of the inlet 16 by a magnetic force, allowing the chips to smoothly move to the back of the drum housing chamber 5 after passing through the vicinity of the top edge of the slope 5A of the drum housing chamber 5.

Therefore, the aforementioned circulation of floating chips never occurs in the periphery of the inlet 16 and there is no possibility that circulating floating chips may finally arrive at the filtration filter 12, leading to clogging of the filtration filter 12 with the chips.

The floating chips which have flown into the drum housing chamber 5 as described above are stirred as the filtration drum 4 rotates or the chip scraping member 8 moves, and flow into the drum housing chamber 5. Upon approaching the bottom surface 5B or the slope 5A of the drum housing chamber 5, the flowing floating chips are attracted to and fixed on the bottom surface 5B or the slope 5A of the drum housing chamber 5 by the magnetic force of the magnet 9. The fixed chips are scraped by the chip scraping member 8 that moves through the gap 5C as shown in FIG. 5 and sent from the baffle plate 7 to the conveying path 2.

Near the baffle plate 7, the inflow of the machining fluid from the conveying path 2 to the drum housing chamber 5 is blocked by the baffle plate. This prevents chips sent from the baffle plate 7 to the conveying path 2 from being sent back to the drum housing chamber 5 riding on the flow of the machining fluid. The chips sent from the baffle plate 7 to the conveying path 2 as described above are conveyed to the ejecting port 11 by the chip conveying member 3 and ejected to the outside from the ejecting port 11.

The present invention is not limited to the above-described embodiments, but many modifications can be made by those who have normal knowledge in the art without departing from the technical thought of the present invention.

What is claimed is:

1. A filtration apparatus that removes chips from a chip-containing machining fluid, comprising:

a conveying path for the chips; a chip conveying member provided in the conveying path;

a filtration drum provided parallel to the conveying path;

a drum housing chamber that houses the filtration drum;

a communication section that communicates with the drum housing chamber from the conveying path via an inlet;

a baffle plate disposed in the communication section;

a chip scraping member provided in the drum housing chamber; and a magnet attached to an outer wall surface of the drum housing chamber, wherein the conveying path comprises an input port for a machining fluid provided on an upstream side thereof and an ejecting port for chips provided on a downstream side thereof, the chip conveying member conveys chips in the machining fluid from the input port to the ejecting port, the filtration drum is driven to rotate around a shaft center parallel to the chip conveying direction in the conveying path, an outer circumferential surface of the filtration drum constituting a filtration filter for the machining fluid, the drum housing chamber is provided with a slope inclined from a side wall of the conveying path toward the filtration drum near the communication section and a bottom surface continuous to the slope, and includes a gap that allows the chip scraping member to move between the bottom surface or the slope and the outer circumferential surface of the filtration drum, the baffle plate has a width smaller than that of the communication section, has such a shape that extends from the slope of the drum housing chamber through the communication section so as to protrude over the conveying path, is disposed closer to one side far from the input port out of both sides of the communication section to thereby function as means for blocking the machining fluid from flowing from the conveying path into the drum housing chamber via the communication section within a setup range, while allowing the machining fluid to flow into the drum housing chamber outside the setup range, the chip scraping member functions as means for moving through the gap of the drum housing chamber toward the communication section to thereby scrape chips from the bottom surface or the slope of the drum housing chamber and sending the scraped chips from the baffle plate to the conveying path, the magnet functions as means for fixing the chips in the machining fluid flowing into the drum housing chamber from the inlet by a magnetic force on the bottom surface or the slope of the drum housing chamber, and the periphery of the inlet is configured as a magnet non-existing section where the magnet does not exist so as to suppress a phenomenon that chips in the machining fluid are fixed in the vicinity of a top edge of the slope of the drum housing chamber by the magnetic force of the magnet.

2. The filtration apparatus according to claim 1, wherein the filtration drum including the filtration filter is formed of a non-magnetic material or a magnetic material.

3. The filtration apparatus according to claim 1, wherein the chip conveying member is formed of a non-magnetic material or a magnetic material.

4. The filtration apparatus according to claim 1, wherein the vicinity of the top edge of the slope located in the periphery of the inlet is used as the magnet non-existent section and the magnet is provided in a range covering the remaining slope portion and the bottom surface of the drum housing chamber.

* * * * *